(No Model.)

F. E. McMULLIN.
METALLIC BOX OR ATTACHMENT, &c.

No. 444,844. Patented Jan. 20, 1891.

UNITED STATES PATENT OFFICE.

FRANK E. McMULLIN, OF HASTINGS, IOWA.

METALLIC BOX OR ATTACHMENT FOR CULTIVATORS.

SPECIFICATION forming part of Letters Patent No. 444,844, dated January 20, 1891.

Application filed April 20, 1889. Serial No. 308,038. (No model.)

*To all whom it may concern:*

Be it known that I, FRANK E. McMULLIN, a citizen of the United States, residing at Hastings, in the county of Mills and State of Iowa, have invented certain new and useful Improvements in Metallic Boxes for Attachment to Cultivators to Protect Listed Corn, of which the following is a description.

This invention has relation to fenders for listed-corn cultivators; and the objects in view are to provide a fender of cheap and simple construction that is capable of being adjusted so as to shed more or less dirt, and which will draw evenly and readily yield to any irregularities of the corn-rows.

Other objects and advantages of the invention will hereinafter appear, and the novel features thereof will be particularly pointed out in the claim.

Figure 1:
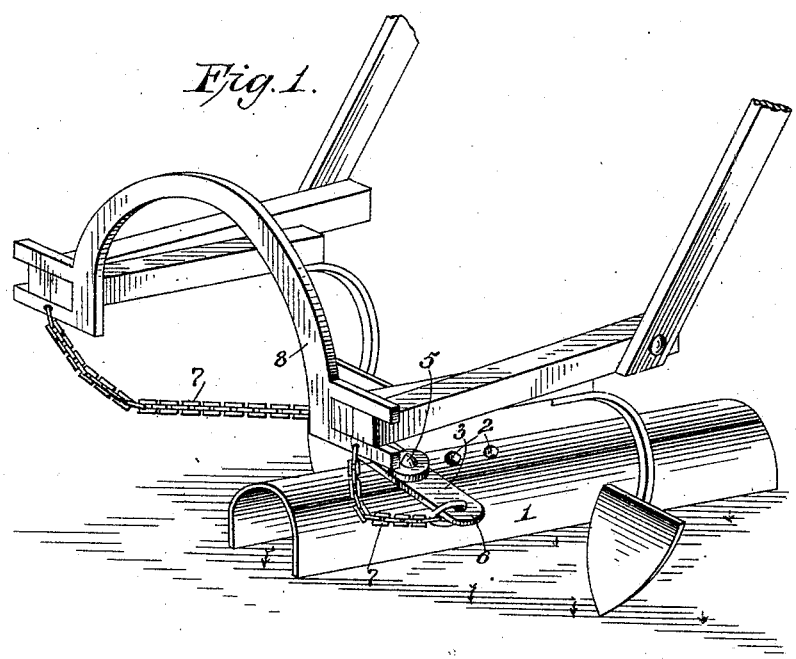
Figure 2:
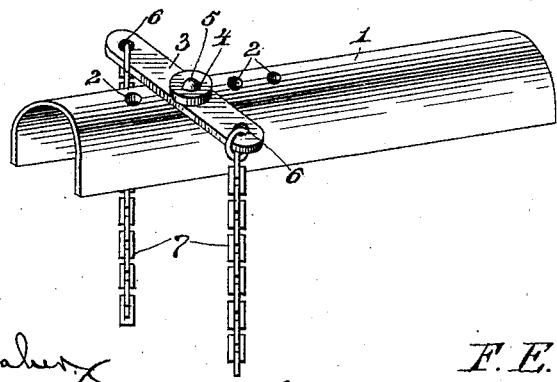

Referring to the drawings, Figure 1 is a perspective of a portion of a listed-corn cultivator, a fender constructed in accordance with my invention being connected thereto, and Fig. 2 is a detail in perspective of the fender.

Like numerals of reference indicate like parts in both figures of the drawings.

1 designates a half-cylindrical metal hood or fender of suitable dimensions, the same being provided from a point near its transverse center to its front end with a series of bolt-openings 2.

3 designates an evening bar or lever, which at its center is provided with a perforation or bolt-hole 4, through which and through any one of the perforations or bolt-holes 2 of the fender is passed a removable bolt 5, which serves as a means for pivotally connecting the bar to the fender at a desired point along the same. The outer ends of the bar are also perforated, as at 6, and in each of said perforations is loosely connected a draft-chain 7. The chains 7 are connected to the inverted-U-shaped cultivator-frame 8, and may be adjusted to a proper length.

In operation the fender straddles and covers the young corn, preventing the dirt thrown by the shovels from falling back upon the corn. By reason of the pivotal connection of the fender and evener-bar the fender is free to swing and yield laterally, so as to readily accommodate its line of travel to any irregularities in the corn-row. By changing the bolt 5 to the various bolt-openings in the fender the fender may be adjusted so as to occupy various positions with relation to the plows.

Having described my invention, what I claim is—

The combination, with the cultivator-frame, of the semi-cylindrical fender provided in front of its transverse center with a series of bolt-openings, the evening-bar, the bolt removably and pivotally connecting the bar with one of the adjusting-holes of the fender, and draft-chains connected to the opposite ends of the said bar and at their front ends to the frame of the cultivator, substantially as specified.

Dated this 13th day of June, 1888.

FRANK E. McMULLIN.

Witnesses:
A. E. COOK,
L. BENTLEY.